US009456940B2

(12) United States Patent
DeLeo et al.

(10) Patent No.: US 9,456,940 B2
(45) Date of Patent: Oct. 4, 2016

(54) LOAD SENSING SYSTEM FOR WHEELCHAIR LIFT ARRANGEMENT (71) Applicant: RICON CORP., Panorama City, CA (US)

(72) Inventors: Dante V. DeLeo, Santa Clara, CA (US); Haur Tsu Su, West Covina, CA (US)

(73) Assignee: Ricon Corp., San Fernando, CA (US)

( * ) Notice: Subject to any disclaimer, the term of this patent is extended or adjusted under 35 U.S.C. 154(b) by 92 days.

(21) Appl. No.: 14/384,486

(22) PCT Filed: Mar. 14, 2013

(86) PCT No.: PCT/US2013/031716
§ 371 (c)(1),
(2) Date: Sep. 11, 2014

(87) PCT Pub. No.: WO2013/138661
PCT Pub. Date: Sep. 19, 2013

(65) Prior Publication Data
US 2015/0107911 A1 Apr. 23, 2015

Related U.S. Application Data (60) Provisional application No. 61/611,793, filed on Mar. 16, 2012.

(51) Int. Cl.
*A61G 3/08* (2006.01)
*G01G 19/02* (2006.01)
*H01H 3/16* (2006.01)
(Continued)

(52) U.S. Cl.
CPC ............ *A61G 3/062* (2013.01); *B60P 1/4478* (2013.01); *B66B 9/02* (2013.01); *G01G 19/025* (2013.01); *H01H 3/16* (2013.01); *A61G 2203/32* (2013.01);
(Continued)

(58) Field of Classification Search
CPC  H01H 3/14; H01H 3/16–3/18; H01H 35/00; H01H 35/006; A61G 3/062; A61G 2203/32; A61G 2203/44; G01G 3/10; G01G 19/025; B60P 1/4478; B60P 1/43; B66B 9/02
USPC ............................................... 200/85 R–85 A
See application file for complete search history.

(56) References Cited

U.S. PATENT DOCUMENTS 3,851,129 A * 11/1974 Kornylak ............... H01H 3/168
200/61.69
3,883,844 A * 5/1975 Wood, II ................... B60R 3/02
200/61.44
(Continued)

FOREIGN PATENT DOCUMENTS

EP 1582404 A2 10/2005
WO 2011116032 A2 9/2011

*Primary Examiner* — Randy W Gibson
(74) *Attorney, Agent, or Firm* — The Webb Law Firm (57) ABSTRACT A load sensing system for a wheelchair lift arrangement includes an elongated member that is rotatable about a longitudinal axis between an unloaded position and a loaded position; a biasing member that biases the elongated member toward the unloaded position; at least one contact member connected to the elongated member and configured to contact a bridge plate; and a switch assembly operatively connected to the elongated member, the switch assembly being configured to be activated to prevent operation of the wheelchair lift arrangement when the elongated member is in the loaded position. A method of regulating movement of a lift platform of a wheelchair lift arrangement is also provided.

21 Claims, 5 Drawing Sheets (51) Int. Cl.
*H01H 35/00* (2006.01)
*B60P 1/43* (2006.01)
*A61G 3/06* (2006.01)
*B60P 1/44* (2006.01)
*B66B 9/02* (2006.01)

(52) U.S. Cl.
CPC .............. *A61G 2203/44* (2013.01); *B60P 1/43* (2013.01); *H01H 35/00* (2013.01); *H01H 35/006* (2013.01)

(56) References Cited

U.S. PATENT DOCUMENTS

| | | | | |
|---|---|---|---|---|
| 4,266,106 | A * | 5/1981 | Fraser | H01H 3/16 200/61.44 |
| 5,261,779 | A * | 11/1993 | Goodrich | B60P 1/4442 414/546 |
| 5,439,342 | A * | 8/1995 | Hall | B60P 1/44 105/447 |
| 5,583,322 | A * | 12/1996 | Leisinger | G01G 21/286 16/342 |
| 5,720,523 | A * | 2/1998 | Kawabata | H01H 3/141 200/85 A |
| 5,901,812 | A * | 5/1999 | Meunier | B66B 9/0853 187/200 |
| 6,077,025 | A * | 6/2000 | Budd | A61G 3/06 414/546 |
| 6,179,545 | B1 | 1/2001 | Petersen, Jr. et al. | |
| 6,692,217 | B1 * | 2/2004 | Pierrou | B60P 1/4471 414/539 |
| 6,903,286 | B2 * | 6/2005 | Kaijala | H01H 3/16 200/85 A |
| 7,500,818 | B1 | 3/2009 | Johnson | |
| 2001/0036397 | A1 * | 11/2001 | Pierrou | B60P 1/4471 414/540 |
| 2003/0021666 | A1 | 1/2003 | Dupuy | |
| 2003/0213653 | A1 | 11/2003 | Morris | |
| 2005/0077111 | A1 | 4/2005 | Sobota et al. | |
| 2006/0233632 | A1 * | 10/2006 | Hayes | A61G 3/062 414/546 |
| 2007/0071569 | A1 | 3/2007 | Sobota et al. | |

* cited by examiner

LOAD SENSING SYSTEM FOR WHEELCHAIR LIFT ARRANGEMENT

CROSS REFERENCE TO RELATED APPLICATION

This application is the United States national phase of International Application No. PCT/US2013/031716 filed Mar. 14, 2013, and claims priority from U.S. Provisional Patent Application No. 61/611,793, filed on Mar. 16, 2012, the disclosures of which are incorporated herein by reference in their entirety.

BACKGROUND OF THE INVENTION

1. Field of the Invention

The present invention relates generally to access systems and wheelchair lift arrangements, for example wheelchair lift arrangements for use in connection with a vehicle, and, in particular, to a load sensing system and arrangement for use in connection with such access systems and wheelchair lift arrangements.

2. Description of Related Art

As is known in the art, access systems and wheelchair lift arrangements are provided to permit access, entry, exit, ingress, egress, and the like, from a variety of structures and environments. For example, many vehicles are fitted or configured to interact with a wheelchair lift arrangement to allow a wheelchair (or other limited mobility) user to enter and exit the vehicle. A typical wheelchair lift arrangement for a vehicle includes a bridging plate assembly which, during operation, bridges the gap between the lift platform and the floor of the vehicle or the base plate.

Based upon recent regulations directed to such vehicle-based wheelchair lift arrangements, it is now a requirement for public wheelchair lift arrangements to be equipped with a load detection system for the bridging plate assembly. As discussed, the bridging plate assembly acts as a bridge between the lift platform and the vehicle floor or base plate (when the wheelchair lift arrangement is at floor level). When the wheelchair lift arrangement lowers below floor level, the bridging plate moves to a raised position and acts as an inboard barrier to the platform. If there is a load of about 25 pounds applied to the bridging plate while the lift is at floor level, the lift platform must be disabled from lowering and raising the bridging plate.

Due to certain irregularities in the flatness of the mounting structures, the sensitivity of this load detection system may be compromised. For example, many wheelchair lift arrangements tend to be sensitive to the flatness of the floor to which they are mounted, which can cause bowing of the base plate.

SUMMARY OF THE INVENTION

Accordingly, there exists a need in the art to provide an improved load sensing system for a vehicle-based wheelchair lift arrangement.

Generally, provided is a load sensing system for a wheelchair lift arrangement that addresses and/or overcomes some or all of the drawbacks and deficiencies that exist in current access systems and/or wheelchair lift arrangements. Preferably, provided is a load sensing system for a wheelchair lift arrangement that is useful in connection with vehicle-based wheelchair lift arrangements. Preferably, provided is a load sensing system for a wheelchair lift arrangement that complies with certain regulations governing the installation, operation, and/or use of specified public wheelchair lift arrangements.

Therefore, in one preferred and non-limiting embodiment, provided is a load sensing system for a wheelchair lift arrangement that detects a specified load on a bridge plate assembly and is not substantially subject to any distortions of a base plate mounted on a non-flat vehicle floor. In another preferred and non-limiting embodiment, provided is a load sensing system for a wheelchair lift arrangement that utilizes a minimal vertical transition for a wheelchair user to overcome while traversing onto the lift platform from the vehicle. In a still further preferred and non-limiting embodiment, provided is a load sensing system for a wheelchair lift arrangement that minimizes the effort for entry to the wheelchair lift platform.

In accordance with one embodiment of the present invention, a load sensing system for a wheelchair lift arrangement having a bridge plate is provided. The load sensing system includes an elongated member extending along a longitudinal axis between a first end and a second end and rotatable about the longitudinal axis between an unloaded position and a loaded position; at least one contact member disposed on the elongated member between the first end and the second end, the contact member connected to the elongated member and configured to contact the bridge plate; and a switch assembly operatively connected to the elongated member and configured to be activated to prevent operation of the wheelchair lift arrangement when the elongated member is in the loaded position.

In accordance with another embodiment of the present invention, a wheelchair lift arrangement for attachment to a floor surface positioned at a floor surface level is provided. The arrangement includes a lift platform having a base plate and movable between a lowered position and a raised position, wherein the base plate is positioned at the floor surface level; a bridge plate assembly including a bridge plate extending between the floor surface and the base plate of the lift platform when the lift platform is in the raised position; and a load sensing system. The load sensing system includes an elongated member extending along a longitudinal axis between a first end and a second end and rotatable about the longitudinal axis between an unloaded position and a loaded position; at least one contact member disposed on the elongated member between the first end and the second end, the contact member connected to the elongated member and configured to contact the bridge plate; and a switch assembly operatively connected to the elongated member and configured to be activated to prevent operation of the wheelchair lift arrangement when the elongated member is in the loaded position.

In accordance with yet another embodiment of the present invention, a method of regulating movement of a lift platform of a wheelchair lift arrangement is provided. The method includes the step of providing a wheelchair lift arrangement for attachment to a floor surface positioned at a floor surface level. The wheelchair lift arrangement includes a lift platform having a base plate; a bridge plate assembly including a bridge plate; and a load sensing system. The load sensing system includes an elongated member extending along a longitudinal axis between a first end and a second end and rotatable about the longitudinal axis between an unloaded position and a loaded position; at least one contact member disposed on the elongated member between the first end and the second end, the contact member connected to the elongated member and configured to contact the bridge plate; and a switch assembly operatively connected to the elongated member. The method further includes the steps of: moving the lift platform from a lowered position to a raised position, wherein the base plate is positioned at the floor surface level; extending the bridge plate from the floor surface to the base plate and contacting the bridge plate with the at least one contact member; applying a load to the bridge plate and actuating the at least one contact member to cause the elongated member to rotate to the loaded position; and activating the switch assembly to prevent operation of the wheelchair lift arrangement moving the base plate from the floor surface level.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
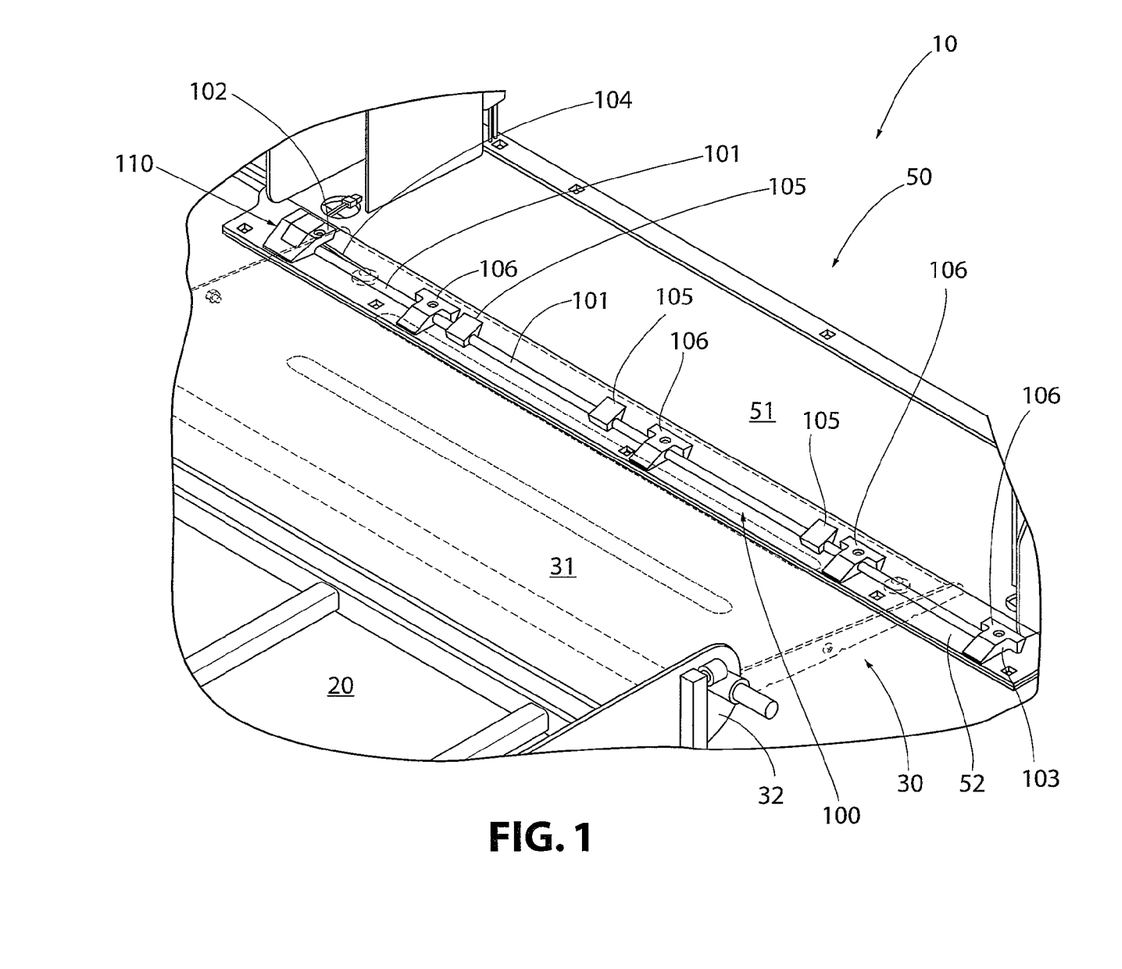
FIG. 1 depicts a perspective schematic view of a wheelchair lift arrangement incorporating a load sensing system in accordance with an embodiment of the present invention.
Figure 2:
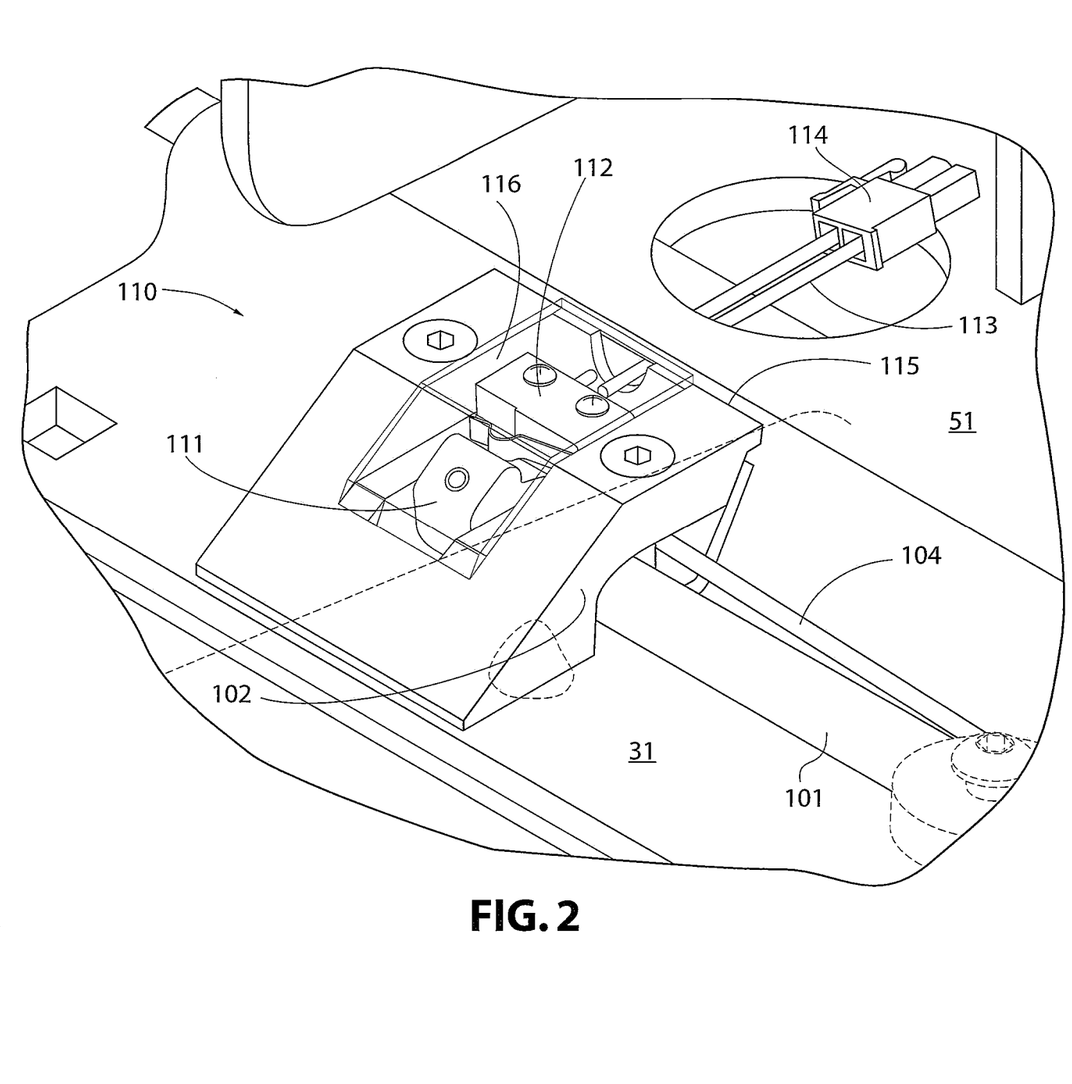
FIG. 2 depicts a detailed perspective schematic view of a portion of the wheelchair lift arrangement and load sensing system of FIG. 1.

With reference to FIGS. 1 and 2, a wheelchair lift arrangement 10 is shown in accordance with an embodiment of the present invention. The arrangement 10 is attached to a floor surface 20 positioned at a floor surface level and includes a lift platform 50. According to one embodiment, the floor surface 20 is defined by the floor of a vehicle (not shown), such as a van or a bus. Alternatively, the floor surface 20 is formed by the mounting structure attaching the wheelchair lift arrangement 10 to the floor and/or frame of the vehicle. In another aspect of the invention, the floor surface 20 is any surface that is raised with respect to a portion of its surroundings such that a person in a wheelchair requires assistance to access or leave the surface. The lift platform 50 is a portion of a wheelchair lift system mounted and installed in the vehicle or raised structure for lifting a disabled person confined to a wheelchair into and out of the vehicle or on and off the raised structure. Such lift systems are well known to those having ordinary skill in the art. It is to be appreciated that the wheelchair lift arrangement 10 and a load sensing system 100, to be discussed in further detail below, are compatible with any one of a number of wheelchair lift systems constructed in a manner consistent with the principles of operation described below. The lift platform 50 includes a base plate 51, which defines the movable surface intended for lifting or lowering a passenger between a ground level or lowered surface and the raised floor surface 20. In particular, the lift platform 50 is movable between a lowered position and a raised position, wherein the base plate 51 is positioned at the floor surface level, as is shown in FIGS. 1 and 2. The base plate 51 may also include a recessed portion or area 52 upon which the load sensing system 100 may be disposed, as will be discussed in further detail below.

The wheelchair lift arrangement 10 also includes a bridge plate assembly 30. The bridge plate assembly 30 includes a bridge plate 31 that extends from the floor surface 20 to the base plate 51 of the lift platform 50 when the lift platform 50 is in the raised position. Accordingly, the bridge plate 31 of the bridge plate assembly 30 functions as a transfer plate that allows a passenger in a wheelchair to move from the base plate 51 of the lift platform 50 to the floor surface 20. The bridge plate assembly 30 may further include a mounting/hinge assembly 32 for securely and pivotably connecting the bridge plate 31 to the floor surface 20. When the lift platform 50 is in the lowered position or below the floor surface level, the bridge plate 31 is raised by a mechanized automatic or manual system about the hinge assembly 32 to a substantially vertical position, and acts as an inboard barrier to the floor surface 20. Accordingly, in the raised position, the bridge plate assembly 30 provides safety to the user and minimizes or eliminates the chance that the wheelchair will move off of the floor surface 20 during operation.

As shown in FIGS. 1-5, and in one preferred and non-limiting embodiment, the wheelchair lift arrangement 10 further includes a load sensing system 100. The load sensing system 100 includes an elongated member 101, which may be a stiff or substantially rigid rod, and which extends along a longitudinal axis L between a first end 102 and a second end 103. The elongated member 101 is rotatable about the longitudinal axis L between an unloaded position (shown in FIG. 4) and a loaded position (shown in FIG. 5). A biasing member 104, which may be a torsion spring disposed alongside the elongated member 101, engages the elongated member 101 and biases the elongated member toward the unloaded position.

Figure 3:
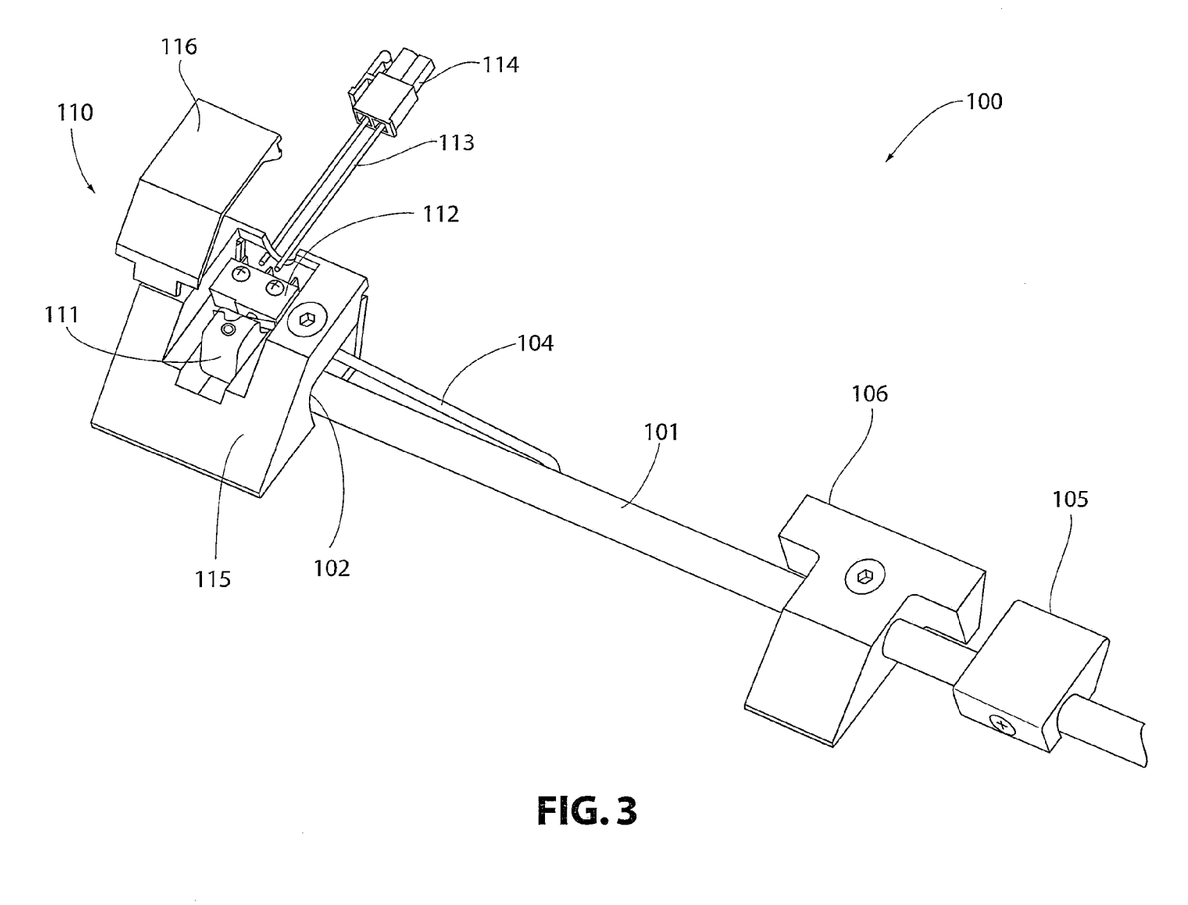
FIG. 3 depicts a detailed perspective view of the load sensing system of FIG. 1.
Figure 4:
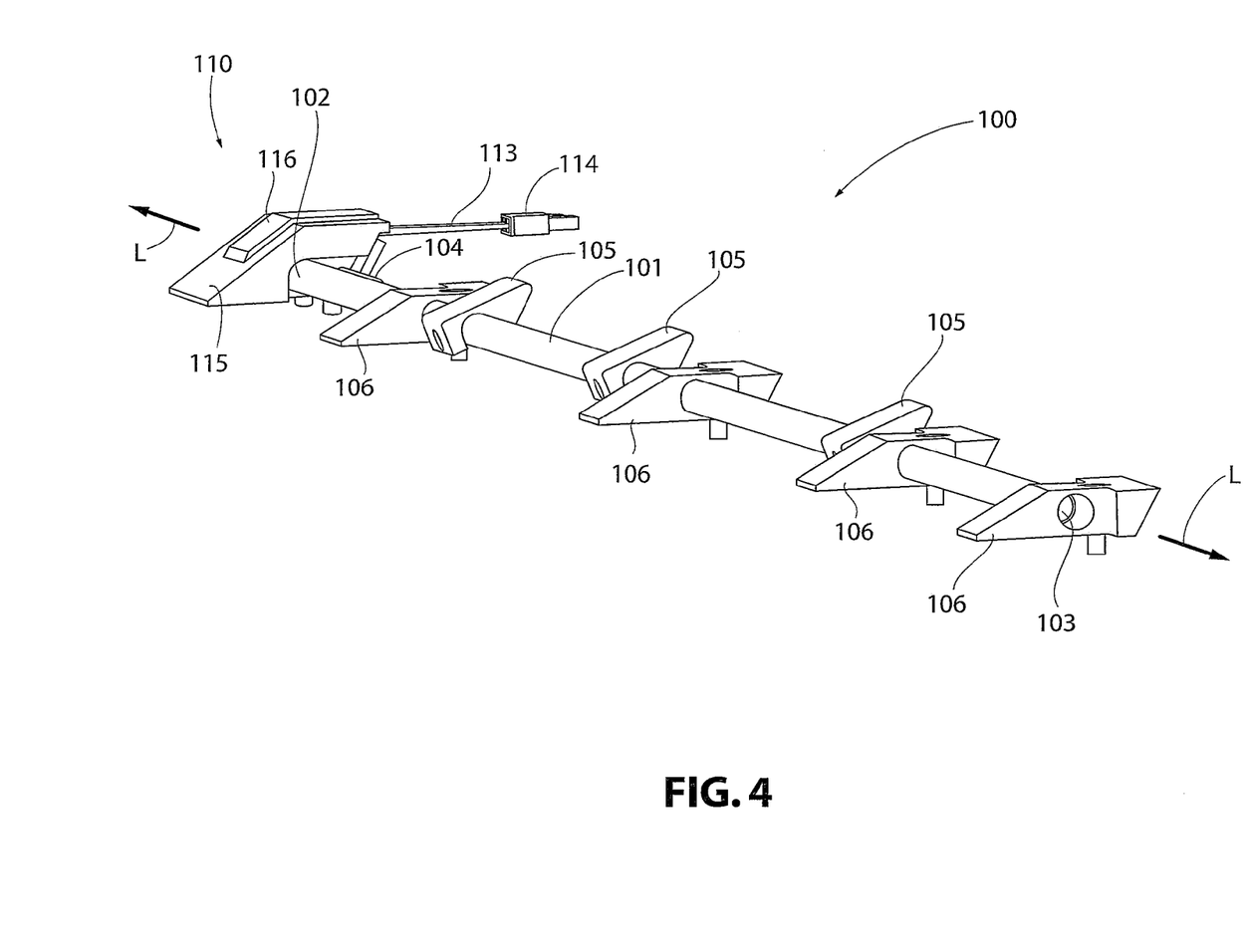
FIG. 4 depicts a perspective view of the load sensing system of FIG. 1 in an unloaded state.
Figure 5:
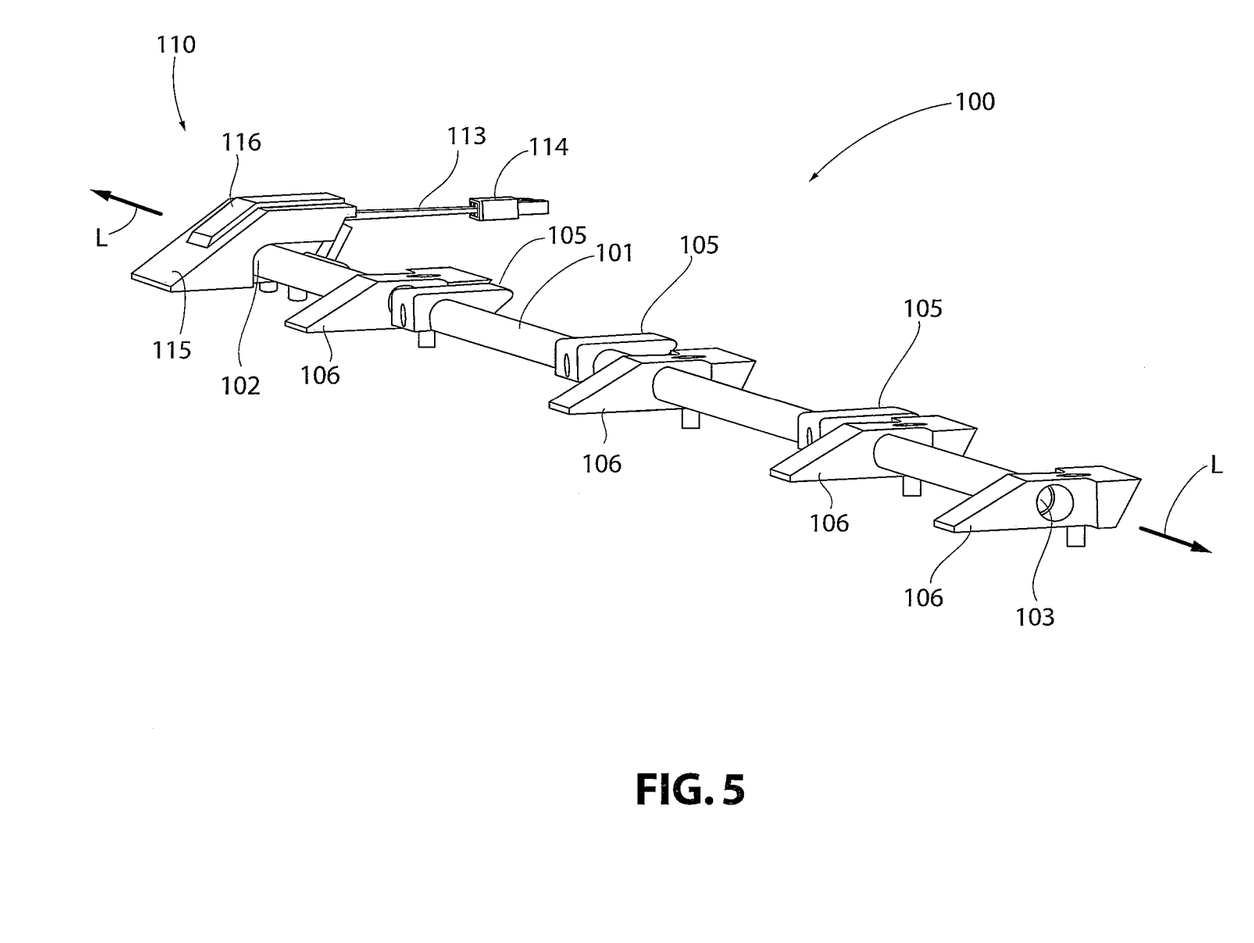
FIG. 5 depicts a perspective view of the load sensing system of FIG. 1 in a loaded state.

At least one contact member 105 is disposed on the elongated member 101 between the first end 102 and the second end 103. The at least one contact member 105 is connected to the elongated member 101 such that movement of the elongated member 101 causes movement of the at least one contact member 105 and vice versa. In one particular aspect of the invention, the at least one contact member 105 is fixedly connected to the elongated member 101, though it is to be appreciated that the contact member 105 may be connected to the elongated member 101 in any manner that allows for rotational movement of the contact member 105 to be transmitted to the elongated member 101 and vice versa. For instance, the at least one contact member 105 may engage a stop or similar element extending from the elongated member 101. In one embodiment, the at least one contact member 105 is configured to extend from the elongated member 101 and engage the bridge plate 31 when the bridge plate 31 is extended from the floor surface 20 to the base plate 51 of the lift platform 50, as is shown in FIGS. 1 and 2. As shown in FIGS. 1, 4, and 5, the load sensing system 100 includes a plurality of, particularly three, contact members 105 spaced across the length of the elongated member 101 between the first end 102 and the second end 103. It is to be appreciated, though, that there may be as few as one and as many as five or six contact members 105 spaced along the elongated member 101 depending upon the size and configuration of the wheelchair lift arrangement 10. Each contact member 105 may be formed as a lever that is disposed around and connected to the elongated member 101 and extends outwardly and upwardly from the elongated member 101 to contact or engage the extended bridge plate 31 above the load sensing system 100. As such, the lever of the contact member 105 will extend upwardly with respect to the elongated member 101 when the elongated member 101 is in the unloaded position, as is shown in FIG. 4. Likewise, the lever of the contact member 105 will be rotatably depressed by the bridge plate 31 about the longitudinal axis L when a load is applied to the bridge plate 31, which causes the bridge plate 31 engaging the at least one contact member 105 to be pressed downward with respect to the floor surface 20 and the base plate 51 of the lift platform 50, as shown in FIGS. 3 and 5.

As shown in FIGS. 1-5, the load sensing system 100 also includes at least one guide block 106 that rotatably receives the elongated member 101. The at least one guide block 106 is fixedly connected to the recessed portion 52 of the base plate 51 by a fastener, such as a screw, or by some other mechanism, such as welding, known to be suitable to those having ordinary skill in the art. The guide block 106, therefore, serves to connect the elongated member 101 to the base plate 51 while allowing the elongated member 101 to rotate with respect to the longitudinal axis L. As shown in FIGS. 1, 4, and 5, the load sensing system 100 includes a plurality of, particularly four, guide blocks 106 spaced along the length of the elongated member 101. The fourth guide block 106 may overlap the second end 103 of the elongated member 101 in order to secure the second end 103. It is to be appreciated that there may be as few as one or two guide blocks 106 and as many as five or six guide blocks 106 provided to the load sensing system 100 depending on the size and configuration of the wheelchair lift arrangement 10.

The load sensing system 100 further includes a switch assembly 110 that is operatively connected to the first end 102 of the elongated member 101 such that rotation of the elongated member 101 about the longitudinal axis L causes activation of the switch assembly 110, as will be described in further detail below. The switch assembly 110 is activated by rotation of the elongated member 101 to prevent operation of the wheelchair lift arrangement 10 when the elongated member 101 is moved to the loaded position. As shown in FIGS. 2 and 3, the switch assembly 110 includes an adjustable switch actuator 111 connected to the first end 102 of the elongated member 101 and a limit switch 112, which may be in the form of a micro-switch. The adjustable switch actuator 111 rotates with the elongated member 101 as the elongated member 101 moves between the loaded and unloaded positions in order to engage the limit switch 112 when the elongated member 101 is in the loaded position and to disengage the limit switch 112 when the elongated member 101 moves from the loaded position to the unloaded position. Accordingly, the adjustable switch actuator 111 engages the limit switch 112 to actuate the limit switch 112 and activate the switch assembly 110 when the elongated member 101 is in the loaded position.

The switch assembly 110 further includes wiring 113 and a connector 114, which connects the switch assembly 110 to a controller (not shown) of the wheelchair lift system such that the switch assembly 110 is able to transmit a signal to the controller to prevent operation of the wheelchair lift arrangement 10 when the elongated member 101 is in the loaded position and the switch assembly 110 is activated. The switch assembly 110 is also provided with a housing 115, which surrounds and protects the actuator 111 and the limit switch 112 from damage. The housing 115 may be fastened or otherwise connected to the base plate 51 in the same manner as the guide blocks 106, as discussed above. The housing 115 may be provided with a removable cover 116 to allow for access to the actuator 111 and the limit switch 112 to allow for replacement or adjustment of the actuator 111 and the limit switch 112.

Therefore, when a load is applied to the bridge plate 31 contacting or engaging the lever of the at least one contact member 105, the lever will actuated by the bridge plate 31, possibly such that it will be rotatably pressed downwardly about the longitudinal axis L, thus causing the elongated member 101 to also rotate about the longitudinal axis L from the unloaded position to the loaded position, which, in turn, causes the adjustable switch actuator 111 to engage and actuate the limit switch 112 in order to activate the switch assembly 110. When the load is removed from the bridge plate 31, the bias applied by the biasing member 104 will cause the elongated member 101 to rotate about the longitudinal axis L towards the unloaded position, thus causing the at least one contact member 105 to rotate upwardly and causing the adjustable switch actuator 111 to disengage the limit switch 112, thereby deactivating the switch assembly 110 and allowing for operation of the wheelchair lift arrangement 10.

With reference to FIGS. 1-5, in accordance with an embodiment of the present invention, a method of regulating movement of a lift platform 50 of a wheelchair lift arrangement 10 includes the step of providing a wheelchair lift arrangement. The wheelchair lift arrangement 10 includes a floor surface 20 positioned at a floor surface level; a lift platform 50 having a base plate 51; a bridge plate assembly 30, the bridge plate assembly 30 including a bridge plate 31; and a load sensing system 100. The load sensing system 100 includes an elongated member 101 extending along a longitudinal axis L between a first end 102 and a second end 103, the elongated member 101 being rotatable about the longitudinal axis L between an unloaded position and a loaded position; at least one contact member 105 disposed on the elongated member 101 between the first end 102 and the second end 103, the contact member 105 being fixedly connected to the elongated member 101 and being configured to extend from the elongated member 101 and contact the bridge plate 31; and a switch assembly 110 operatively connected to the first end 102 of the elongated member 101. The method also includes the steps of moving the lift platform 50 from a lowered position to a raised position, wherein the base plate 51 is positioned at the floor surface level; extending the bridge plate 31 from the floor surface 20 to the base plate 51 and contacting the bridge plate 31 with the at least one contact member 105; applying a load to the bridge plate 31 and actuating the at least one contact member 105 to cause the elongated member 101 to rotate about the longitudinal axis L from the unloaded position to the loaded position; and activating the switch assembly 110 to prevent operation of the wheelchair lift arrangement 10 moving the base plate 51 from the floor surface level. The method may also include the steps of removing the load from the bridge plate 31 to allow the elongated member 101 to rotate to the unloaded position due to the bias of the biasing member 104; and deactivating the switch assembly 110 to allow operation of the wheelchair lift arrangement 10 moving the base plate 51 from the floor surface level.

With reference to FIGS. 1 and 2, according to another aspect of the invention, the load sensing system 100 is connected to the recessed portion 52 of the base plate 51 of the lift platform 50 and is engaged by the bridge plate 31 when the base plate 51 is moved to the raised position, and the bridge plate 31 is extended from the floor surface 20 to the base plate 51 such that there is minimal vertical transition between the base plate 51 and the bridge plate 31. The load sensing system 100 is also disposed on the recessed portion 52 of the base plate 51 such that the elongated rod 101 and the at least one contact member 105 are situated at or below the level of the base plate 51. As such, the load sensing system 100 provides a low-profile feature, which allows for a specified or a minimal or no vertical transition between the base plate 51 of the lift platform 50 and the bridging plate 31. In particular and based upon the unique configuration, the bridging plate assembly 30 according to this embodiment of the present invention does not include overlapping plates. Other existing arrangements and systems use such overlapping plates to detect a load on the bridging plate, thus creating a vertical transition from one plate to the other. This vertical transition, such as a $3/16$-$1/4$ inch transition, represents an Obstacle and/or (potentially unsafe) nuisance that a user of a wheelchair must encounter and traverse to enter and exit the wheelchair lift arrangement. However, in this preferred and non-limiting embodiment of the present invention, this obstacle (i.e., vertical transition or "bump") is minimized or eliminated, representing another benefit of the present invention.

Another benefit of the load sensing system 100 of the present invention is that it is less sensitive to distortions in the floor surface 20, particularly when the floor surface 20 is defined by a mounting plate bolted to a vehicle floor. While an actuator switch assembly having a single contact point at or near the center of the base plate of the lift platform has been previously contemplated, this type of load detection is limited. In particular, if the base plate of the lift platform or the mounting plate were to be distorted, the edge of the bridging plate could make contact with the base plate of the lift platform and the switching mechanism would not detect the load. While adding more switches on or in operable engagement with the base plate of the lift platform may lead to a decrease in the occurrence of this potential operational flaw, the increased locations require a full set of components and complex wiring, which lead to a drastic increase in cost. It is further envisioned that the size, position, configuration, or function of any of the above-discussed components of the load sensing system 100 are adjustable in order to be modified to fit a variety of wheelchair lift arrangements 10 and/or a variety of environments and applications.

In this manner, the load sensing system 100 of the present invention is particularly useful in connection with a vehicle-based wheelchair lift arrangement 10. Further, the load sensing system 100 of the present invention complies with certain regulations governing the installation, operation, and/or use of specified, public wheelchair lift arrangements.

It is to be understood that the invention may assume various alternative variations and step sequences, except where expressly specified to the contrary. It is also to be understood that the specific devices and processes illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment.

The invention claimed is:

1. A load sensing system for a wheelchair lift arrangement having a bridge plate, comprising:
   an elongated member extending along a longitudinal axis between a first end and a second end and rotatable about the longitudinal axis between an unloaded position and a loaded position;
   at least one contact member disposed on the elongated member between the first end and the second end, the at least one contact member connected to the elongated member and configured to contact the bridge plate; and
   a switch assembly operatively connected to the elongated member and configured to be activated to prevent operation of the wheelchair lift arrangement when the elongated member is in the loaded position.

2. The load sensing system according to claim 1, further comprising a biasing member engaging the elongated member and configured to bias the elongated member toward the unloaded position.

3. The load sensing system according to claim 1, wherein the biasing member comprises a torsion spring.

4. The load sensing system according to claim 1, wherein the at least one contact member is configured to be actuated by the bridge plate when the load is applied to the bridge plate to cause the elongated member to rotate about the longitudinal axis from the unloaded position to the loaded position and to activate the switch assembly.

5. The load sensing system according to claim 4, wherein the at least one contact member comprises a plurality of contact members spaced across a length of the elongated member between the first end and the second end, and wherein a largest dimension of the elongated member extends along the longitudinal axis.

6. The load sensing system according to claim 4, wherein the at least one contact member comprises a lever connected to the elongated member and extending outwardly from the elongated member.

7. The load sensing system according to claim 6, wherein the lever is disposed on the elongated member such that the lever extends upwardly when the elongated member is in the unloaded position.

8. The load sensing system according to claim 6, wherein the lever is configured to be depressed by the bridge plate when a load is applied to the bridge plate.

9. The load sensing system according to claim 1, further comprising at least one guide block that rotatably receives the elongated member and is configured to connect the elongated member to a base plate.

10. The load sensing system according to claim 9, wherein the at least one guide block comprises a plurality of guide blocks.

11. The load sensing system according to claim 1, wherein the switch assembly comprises an adjustable switch actuator and a limit switch, and wherein the adjustable switch actuator rotates with the elongated member such that the adjustable switch actuator actuates the limit switch to activate the switch assembly when the elongated member is in the loaded position.

12. A wheelchair lift arrangement for attachment to a floor surface positioned at a floor surface level, the arrangement comprising:
    a lift platform having a base plate and movable between a lowered position and a raised position, wherein the base plate is positioned at the floor surface level;
    a bridge plate assembly including a bridge plate extending between the floor surface and the base plate of the lift platform when the lift platform is in the raised position; and
    a load sensing system, comprising:
        an elongated member extending along a longitudinal axis between a first end and a second end and rotatable about the longitudinal axis between an unloaded position and a loaded position;
        at least one contact member disposed on the elongated member between the first end and the second end, the contact member connected to the elongated member and configured to contact the bridge plate; and
        a switch assembly operatively connected to the elongated member and configured to be activated to prevent operation of the wheelchair lift arrangement when the elongated member is in the loaded position.

13. The wheelchair lift arrangement according to claim 12, wherein the load sensing system further comprises a biasing member engaging the elongated member and configured to bias the elongated member toward the unloaded position.

14. The wheelchair lift arrangement according to claim 12, wherein the at least one contact member is configured to be actuated by the bridge plate when a load is applied to the bridge plate to cause the elongated member to rotate about the longitudinal axis from the unloaded position to the loaded position and to activate the switch assembly.

15. The wheelchair lift arrangement according to claim 14, wherein the at least one contact member comprises a plurality of contact members spaced across a length of the elongated member between the first end and the second end, and wherein a largest dimension of the elongated member extends along the longitudinal axis.

16. The wheelchair lift arrangement according to claim 14, wherein the at least one contact member comprises a lever connected to the elongated member and extending outwardly from the elongated member, and wherein the lever is disposed on the elongated member such that the lever extends upwardly when the elongated member is in the unloaded position and the lever is depressed by the bridge plate when the load is applied to the bridge plate.

17. The wheelchair lift arrangement according to claim 12, further comprising at least one guide block configured to rotatably receive the elongated member and connect the elongated member to the base plate of the lift platform.

18. The wheelchair lift arrangement according to claim 12, wherein the switch assembly comprises an adjustable switch actuator and a limit switch, and wherein the adjustable switch actuator rotates with the elongated member such that the adjustable switch actuator actuates the limit switch to activate the switch assembly when the elongated member is in the loaded position.

19. The wheelchair lift arrangement according to claim 12, wherein the load sensing system is connected to the base plate of the lift platform and configured to be contacted by the bridge plate when the base plate is moved to the raised position and the bridge plate is extended from the floor surface to the base plate, such that there is a specified vertical transition between the base plate and the bridge plate.

20. A method of regulating movement of a lift platform of a wheelchair lift arrangement, comprising:
    providing a wheelchair lift arrangement for attachment to a floor surface positioned at a floor surface level, the wheelchair lift arrangement comprising:
        a lift platform having a base plate;
        a bridge plate assembly including a bridge plate; and
        a load sensing system, comprising:
            an elongated member extending along a longitudinal axis between a first end and a second end and rotatable about the longitudinal axis between an unloaded position and a loaded position;
            at least one contact member disposed on the elongated member between the first end and the second end, the contact member connected to the elongated member and configured to contact the bridge plate; and
            a switch assembly operatively connected to the elongated member;
    moving the lift platform from a lowered position to a raised position, wherein the base plate is positioned at the floor surface level;
    extending the bridge plate from the floor surface to the base plate and contacting the bridge plate with the at least one contact member;
    applying a load to the bridge plate and actuating the at least one contact member to cause the elongated member to rotate to the loaded position; and
    activating the switch assembly to prevent operation of the wheelchair lift arrangement moving the base plate from the floor surface level.

21. The wheelchair lift arrangement according to claim 12, where the bridge plate includes an edge extending along the longitudinal axis, and wherein the elongated member extends an entire length of the edge of the bridge plate.

* * * * *